Patented Jan. 16, 1945

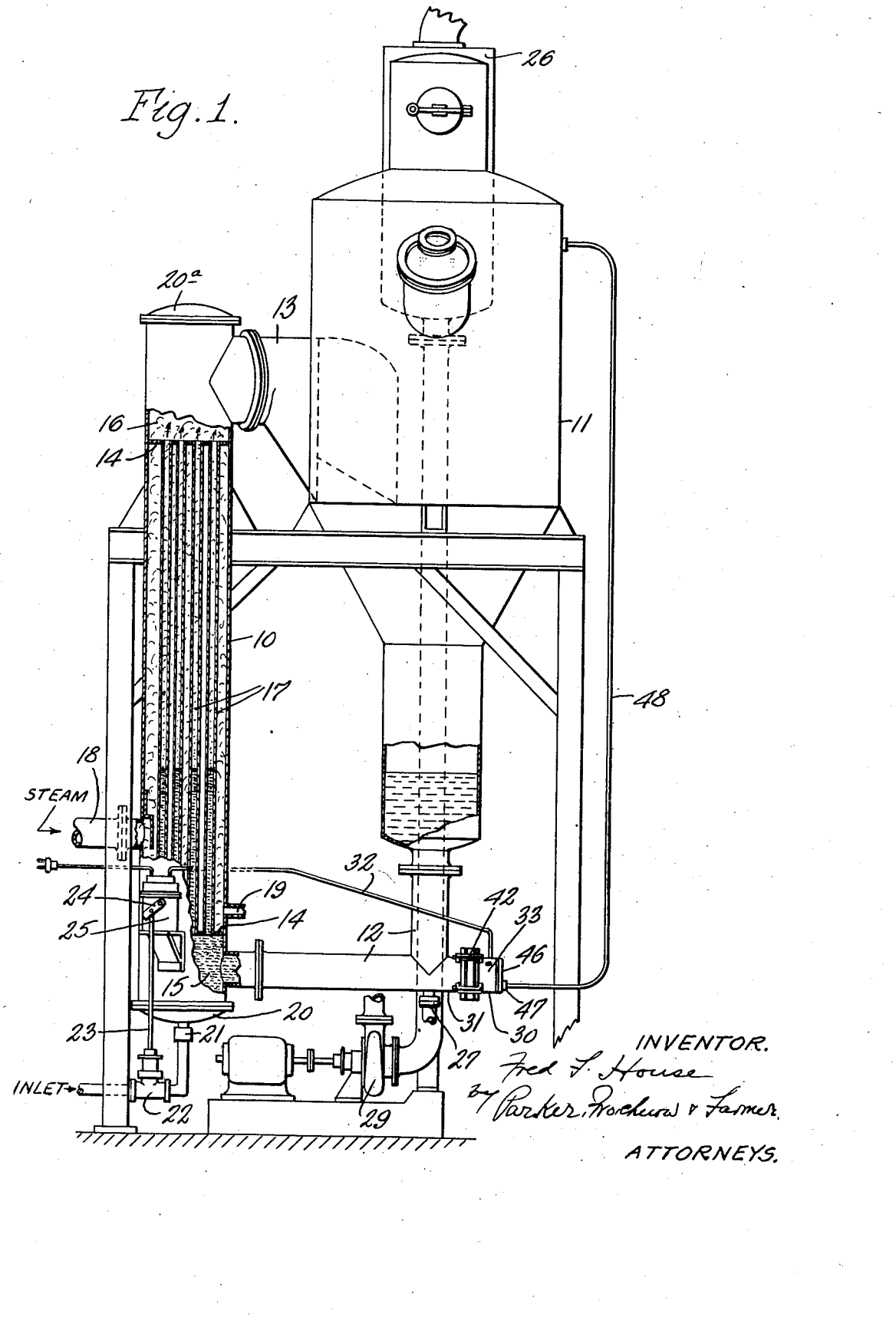

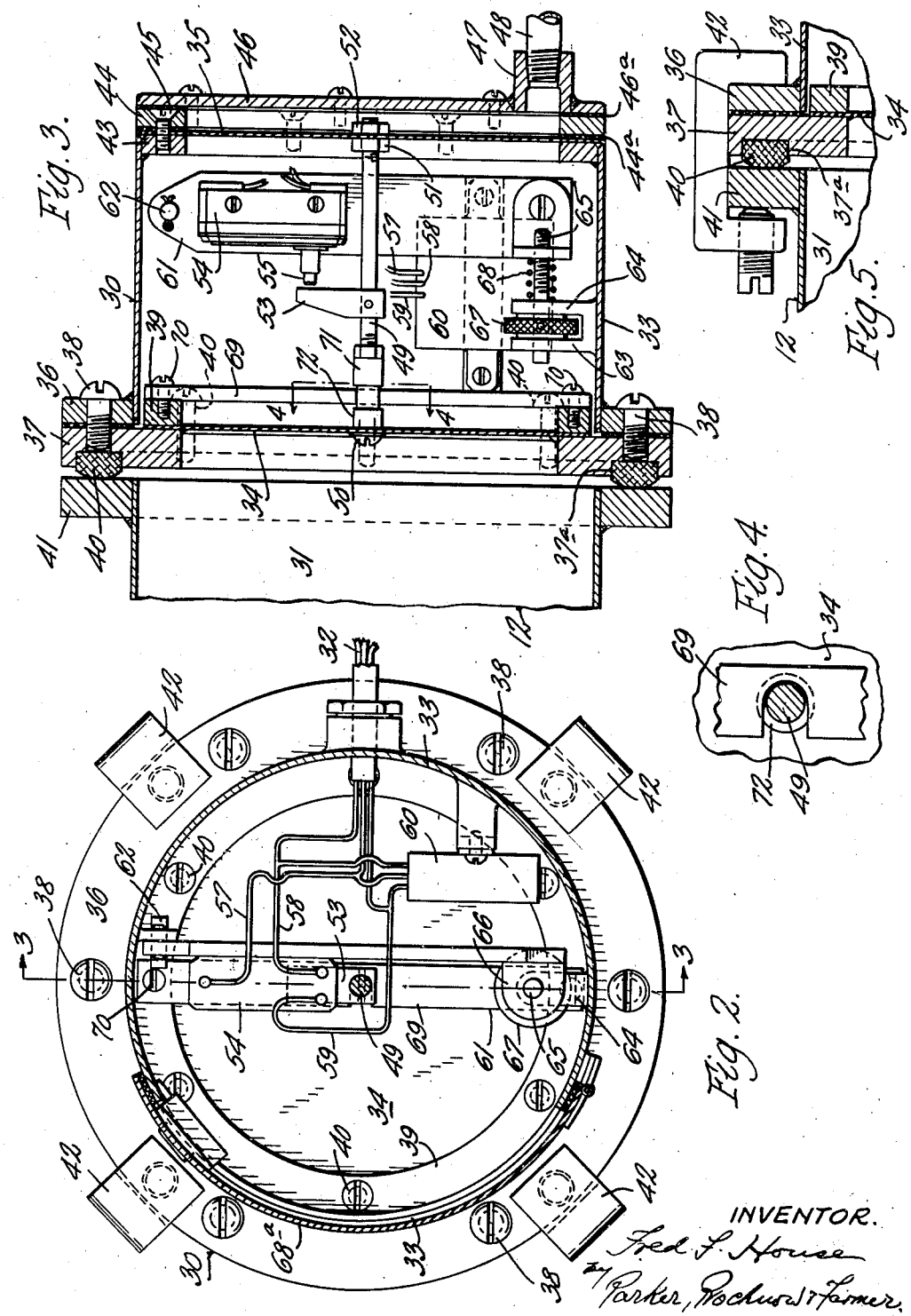

2,367,215

UNITED STATES PATENT OFFICE 2,367,215

DIFFERENTIAL PRESSURE RESPONSIVE DEVICE

Fred F. House, Buffalo, N. Y., assignor to Buffalo Foundry & Machine Co., Buffalo, N. Y.

Application November 1, 1940, Serial No. 363,918

4 Claims. (Cl. 159—44)

This invention relates to differential pressure sensitive instruments and particularly to the use of such devices for automatically regulating liquid levels or density in evaporators, tanks, or other apparatus. Heretofore, various pressure sensitive instruments have been available but they have not been entirely satisfactory. For example, they have lacked quick and accurate adjustment, and sufficient sensitiveness, and some have also been subject to inaccuracies and fluctuations when changes in atmospheric or interior tank pressures occur.

Where the liquid whose density or level is to be controlled is a perishable one, such as milk or other foods, obviously stagnant bodies of the liquid are highly objectionable because of the opportunity offered for bacterial growth as well as the difficulty of cleaning. Some of the prior devices were disposed entirely within the chamber or the liquid, the level or density of which the device was supposed to control, but such devices were objectionable because of the mechanical difficulties of having the movements of the pressure sensitive elements transmitted to the exterior of the tank for the control of the regulating mechanism without the introduction of an objectionable amount of friction or leakage. Many of the prior devices lacked adequate sensitiveness and precision of control, and had little flexibility of application.

One object of this invention is to provide an improved differential pressure sensitive instrument which may be employed for various purposes, including the control of liquid levels in tanks or for controlling the density of liquid in a tank, which is not open to the objections to prior devices, with which convenient access is possible from the outside of the tank to all of the parts necessary for the adjustment of the instrument, such as adjustments for varying the liquid level to be controlled or for varying the density to be regulated, which will be relatively simple, compact and inexpensive, which will have a minimum of parts exposed to the liquid or to the other contents of the tank, which will not be objectionably influenced by turbulence of the liquid in the tank or by changes in atmospheric or interior tank pressures, with which all parts in contact with the liquid may be easily reached for cleaning when used with perishable products such as milk, and with which there will be no objectionable time lag in operation.

Another object of the invention is to provide improved means for controlling the liquid level in an evaporator or other similar device, with which the regulation of the liquid level is accomplished automatically with promptness and accuracy, with which the regulation is quickly responsive to even minor changes in the liquid level, and with which most of the parts thereof are out of contact with the contents of the tank and are easily accessible for inspection and adjustment.

Another object of the invention is to provide an improved density controlling device, in which the density will be regulated in a simple manner with precision and accuracy, which will be quickly sensitive to even minor changes in density, with which most of the parts will be easily accessible from the exterior of the tank for inspection and adjustment, and with which the parts will be largely free from contact with liquid in the tank.

A further object of the invention is to provide an improved instrument of this type which will be unusually sensitive in operation, which will eliminate stuffing boxes, seals, and shafts causing unnecessary friction, and which will be simple and effective in operation.

Another object of my invention is to provide an improved liquid level control which will require no stagnant columns of liquid, which will be sanitary and easily cleaned and, consequently, free from objectionable growth of bacteria, and which will meet with the approval of boards of health.

Another object of my invention is to provide a smooth, flat diaphragm control for liquid bodies which may be readily dismantled, cleaned and sterilized, which will be free from pipe clogging, which will be precise, accurate and sensitive even when the liquid is in violent motion, which may be quickly and accurately adjusted while in operation, and which will not be affected by corrosive fluids or vapors in contact with delicate or sensitive operating parts.

Another object of the invention is to provide an improved control system that is readily adaptable to the automatic control of any differential pressure, such as the pressure drop across an orifice, for the control of rate of flow through a pipe, the difference in pressure between two liquid columns or two separate vessels, and for the control of the specific gravity of a continuously changing column of liquid of predetermined height.

Another object of the invention is to provide improved methods of automatically regulating the liquid level within an evaporator in which continuous evaporation is conducted, and of condensing a liquid continuously to a liquid with a density within selected limits.

Another object is to provide an improved method of automatically controlling the density of a stream of liquid by which the density is kept within selected, relatively narrow limits.

Other objects and advantages will be apparent from the following description and the drawings, disclosing an installation in accordance with the invention, and the novel features will be particularly pointed out hereinafter in connection with the appended claims.

In the accompanying drawings:

Fig. 1 is a front elevation, partially in section, of an evaporator having a control instrument constructed in accordance with my invention;

Fig. 2 is a sectional elevation of a pressure sensitive instrument forming a part of my invention;

Fig. 3 is a sectional elevation partially in section of the same taken approximately along the line 3—3 of Fig. 2;

Fig. 4 is an elevation, partially in section of the same taken approximately along the line 4—4 of Fig. 3, and illustrating the shape of the vertical slotted bearings;

Figure 6:
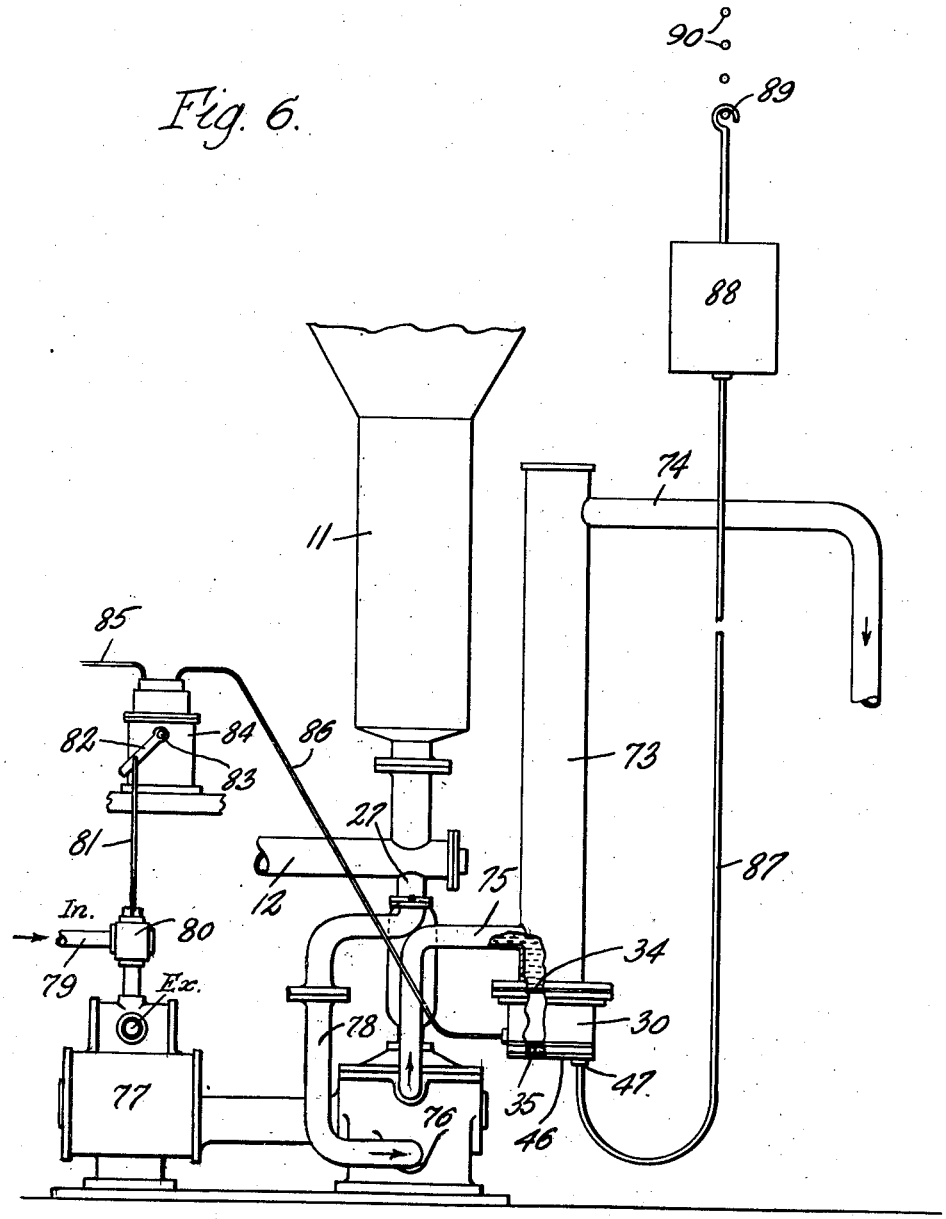

Fig. 5 is a detailed, sectional elevation illustrating the manner in which the pressure sensitive instrument is clamped to an evaporator or other liquid containing device; and Fig. 6 is an elevation of a density control device embodying a differential, pressure-controlled instrument also constructed in accordance with this invention, and which may be employed in combination with the evaporator or level controlling device of Fig. 1.

An embodiment of the invention as shown in Fig. 1 comprises a conventional type of evaporator having two more or less vertical tanks or wells 10 and 11, spaced apart and connected at their lower ends by a pipe or conduit 12 and at an upper point by a conduit 13. A pair of headers 14 are disposed near either end of the well 10, and form, together with the end portions of the tank or well 10, a pair of chambers 15 and 16 respectively. A bank of tubes 17 secured at either end to the headers 14 connects the lower chamber 15 with the upper chamber 16. The intermediate portion of the tank or well 10 between the headers 14 comprises a closed steam jacket or steam chest for heating the tubes, and has a suitable inlet for steam 18, and an outlet 19 for any condensed steam.

The ends of the well or tank 10 are closed by suitable caps 20 and 20a. A supply or feed pipe 21 communicates with the lower chamber 15 of the tank or well 10 through the lower cap 20, and this inlet supplies the evaporator with the fluid or liquid or other matter to be concentrated therein. A valve 22 controls the flow of liquid through the supply pipe 21, and the valve in turn is opened and closed by a connecting rod 23 which is secured at one end to the valve stem and at the other end to the crank arm 24 actuated by a controlling motor 25. The flow of liquid into the tank is thus controlled by the activity of the motor 25.

In this type of evaporator sufficient liquid is usually admitted to partially fill the tubes between the two headers previously described. Steam supplied from any convenient source to the steam jacket or steam chest heretofore described heats and vaporizes the liquid in the tubes, which passes into the upper chamber 16 as a mixture of vapor and entrained liquids and then off through the conduit 13 into the tank or well 11, which is ordinarily celled a vapor separator in this type of evaporator. In the vapor separator 11 any liquids entrained by the vapors coming through the conduit 13 fall to the bottom of the well, whereas the vapors are withdrawn through a suitable opening or conduit adjacent the top of the well or tank 11 into a condenser 26 of any suitable or conventional type ordinarily used in connection with this type of evaporator, and a tail pipe 28 connects the condenser 26 with a motor driven tail pipe pump 29 which is also conventional in this type of evaporator. The lower part of the tank 11 communicates directly with the lower chamber 15 of the tank or well 10 through the conduit 12, and the lower portions of the two tanks or wells together with the conduit 12 form a more or less U-shaped reservoir holding the liquid to be treated. A liquid outlet is usually provided adjacent the lower end of the well or tank 11, such as outlet pipe 27.

It will be understood that liquid admitted through the inlet is heated and partially vaporized in the tank 10 and then passes through conduit 13 into the vapor separator tank 11, that liquids entrained are separated from the vapors in the tank or well 11, and that the material which falls into the bottom of the tank or well 11 may be recirculated through the heating tank 10, all of which is usual and conventional in this type of apparatus and which of itself forms no part of my invention. It is also frequently desirable to keep the interiors of such evaporators under a partial vacuum to assist the vaporization of liquids to be treated.

It is highly desirable to carefully control the level of the liquid in the heater tubes. If the proper liquid level is not maintained, the capacity of the evaporator may be adversely affected, and tubes may become coated. Moreover, the liquid level affects the rate of heat transfer and should be carefully adjusted for the most efficient operation of the evaporator consistent with a good product. To this end, the evaporator is provided with an improved, automatic pressure sensitive instrument 30 which is mounted on the evaporator at any suitable point below the desired liquid level therein, such as adjacent the corner of the pipe 12 as shown in Fig. 1. The instrument communicates with the interior of the evaporator through the projecting neck 31 of the pipe 12, and is preferably disposed adjacent a portion of the body of the liquid which is in motion, so that the liquid in communication with the instrument will not be stagnant, with the consequent danger of breeding bacteria in such liquids as milk or other foods. The instrument 30, which will be hereinafter fully described, controls an electric circuit which includes the wires 32 connected to the electric motor 25, and the motor in turn operates the inlet valve.

Referring now to the Figs. 2, 3, 4, and 5, the pressure sensitive instrument has a somewhat cylindrical shell or frame 33 with an open end adjacent the evaporator aligned with an opening of substantially corresponding size in the projecting pipe or neck 31. To opposite ends of the frame 33 are secured two flexible diaphragms 34 and 35 which are approximately parallel and in face to face but spaced relationship, and which substantially close the circular openings in opposite ends of said frame, the diaphragm 34 thus being in direct contact with the material in the evaporator reservoir.

The end of the frame or shell nearest to the evaporator has an outwardly projecting ring or flange 36 which is secured to another annular member 37 in any suitable manner, such as by screws 38. The inner portion of the ring 37 has a smooth annular surface which abuts against the diaphragm 34. The periphery of the diaphragm 34 is clamped against this smooth surface in any suitable manner such as by means of a clamping ring 39 and screws 40 (Figs. 2 and 3) which prevent escape of liquid past the diaphragm. The diaphragm 34 is thus exposed to the liquid in the evaporator well or reservoir over the major part of its area but securely held in place, and yet access may be easily had to that side of the diaphragm which is exposed to the liquid, for cleaning.

A suitable gasket or the like may be inserted between the flange 36 and the member 37. The member 37 also has an annular groove 37a in the face abutting the neck 31 in which groove a suitable gasket or packing member 40 may be inserted. The neck or pipe 31 has a projecting flange 41 somewhat similar to the flange 36, and the diaphragm device may be conveniently secured to the evaporator by clamping the flange 36 and the member 37 removably against the flange 41 with suitable clamps 42, such as shown in Figs. 2 and 5. The gasket 40 assures a fluid tight connection between the control device and the evaporator. Nevertheless, the instrument may be quickly and easily removed from the evaporator for cleaning, adjustment or repairs.

The diaphragm 35 is clamped in place against an inwardly projecting flange 43 of the frame or shell 33 by means of a clamping ring 44, similar to the ring 39, which is suitably secured against the periphery of the diaphragm as by screws 45. A gasket 44a may be interposed between the diaphragm 35 and ring 44. The outer end of the control instrument is covered by a cap 46 secured to the clamping ring 44, with an interposed gasket 46a, and forms together with the clamp ring 44 and the diaphragm 35 a chamber into which fluids are admitted through a suitable boss 47 on the cap 46. A pipe 48 usually connects the boss 47 with the interior of the vapor separator or well 11 of the evaporator at a point substantially above the desired level of the liquid in said evaporator for a purpose which will appear presently, but in some cases the pipe 48 is omitted and boss 47 opened directly into the atmosphere.

It will be noted that the outer face of the diaphragm 35 is subjected to the pressure within the upper part of the evaporator, whereas the face of the diaphragm 34 adjacent the pipe 31 is subjected to the pressure of the liquid in the evaporator at a point substantially below the desired or expected minimum level of said liquid. Movable parts of the two diaphragms 34 and 35, such as the central zones thereof, are connected together by a rod or member 49 which is secured to the said diaphragms in any convenient manner, the diaphragms 34 preferably being secured to one end of the rod member by a screw 50, and the other diaphragm 35 being secured to the other end of said member by means of a pair of nuts 51 and 52 which have a threaded engagement with said rod and clampingly, yet adjustably, hold the adjacent zone of the diaphragm between them. Movements of the diaphragms are thereby synchronized with one another so that the pressure exerted by the liquid on the diaphragm 34, which includes the pressure due to the weight of the liquid plus the pressure due to the vapor or gas in the space above the liquid, will be offset to some extent by the pressure of the vapor or gas in that same space above the liquid against the outer face of the diaphragm 35, and any flexing of the diaphragms will be caused only by the resultant of forces acting in opposite directions on the two diaphragms.

It will be readily observed that regardless of any non-atmospheric pressures in the evaporator above the liquid level therein, any pressures either above or below atmospheric in the evaporator will act in opposite directions on the connected diaphragms 34 and 35 and tend to balance one another, so that the only resultant forces which act on the diaphragms and tends to move them will be that caused by the head or column of liquid in the evaporator above the diaphragm 34. Consequently, any flexing or movement of the diaphragms will be in response only to changes in the level of the liquid in the evaporator regardless of any changes in vapor pressure, or of any vacuum or above atmospheric pressure in the tanks or wells 10 and 11.

The movements of the connected diaphragms under the effective forces from the column or head of liquid in the evaporator may be used to control the liquid level in the evaporator in any of a number of ways. In the illustrated embodiment the rod 49 carries a projecting abutment or part 53. A highly sensitive switch 54, an example of which is available on the open market under the name "micro switch," is mounted between the diaphragms and adjacent this part 53 and has an operating element or button 55 which is engaged and operated by the part 53, so that the sensitive or micro switch will be operated to create one circuit condition by the movements of the connected diaphragms and the part 53 in one direction, and to create another and different circuit condition by its own inherent mechanism when button 55 is released by abutment 53. The switch preferably has a snap action, so that when the operating element reaches a critical point, the switch will snap from one position to another, without lag. The switch is suitably mounted and secured to the frame and has three terminals connected to wires 57, 58, and 59, which form a three-wire cable 32, passing through the wall of the shell 33 and communicating with motor 25.

The switch 54 may merely close and open a circuit to motor 25, but in the example illustrated the switch operates to reverse the motor 25. The reversible motor 25 is preferably a shaded-pole induction motor, and such a motor and its three wire control system may be supplied with current from the usual 110 volt source through an ordinary connecting wire and wall plug. Such motors and their control and reversing circuits have long been known in the prior art and are obtainable in the open market, and since the present invention is in the use of such a motor and its control system in the combination, and not in the details of the motor and its control circuits, a detailed disclosure thereof has been omitted in the interest of brevity. It should be noted, however, that an electric condenser 60 is disposed within the space between the two diaphragms on the shell or frame and has a connection with each of the wires 57, 58, and 59. This condenser is of the usual type and is inserted in the two alternate circuits for the purpose of preventing arcing between the switch contacts. The motor 25 runs almost continuously and has a gear train giving a large speed reduction by which it slowly closes or opens the valve 22 by means of the crank arm 24 and the connecting rod 23, the period to open or close being that for which the train is designed and which may be from 2 to 20 minutes, for example, the train being capable of adjustment.

A liquid level control so constructed is extremely effective in that it is operated directly by the movable diaphragms with practically no time lag due to friction, such as may be encountered with float controls which must exert considerable force to overcome shaft packing or valve friction and other similar devices. All the operating parts, with the exception of the diaphragms, are disposed within the frame between the two diaphragms where they are protected from dust and dirt, and where they are not subject to corrosion from liquid in the evaporator.

The pressure sensitive instrument operates as follows to control the level of the liquid in the evaporator. Assume that the motor 25 is running in such a manner as to open the valve 22. The liquid level within the evaporator rises until a critical point is reached, at which point the connected diaphragms, under the influence of the increased head of liquid, move as a unit and through rod 49 and abutment 53 act upon the switch button 55 to cause a reversal of the motor. This initiates a closing movement of the valve 22. The valve continues to close slowly under the action of the motor which restricts the flow of liquid through the inlet into the evaporator. Since the liquid is being evaporated continuously, it follows that when the inflow through the valve is less than the quantity evaporated, the liquid level in the evaporator will fall, and, consequently, there will be a lesser resultant pressure on the connected diaphragms. The diaphragms tend to return to normal positions and in doing so, abutment 53 will release button 55, whereupon the switch actuates itself to reverse the motor. The motor 25 then initiates an opening movement of the valve 22 and the entire operation is repeated. The instrument thus used is very sensitive and it has been found in practice that the level of milk, for example, in an evaporator can be automatically maintained with variations within a few inches. Moreover, the entire instrument can be quickly and easily attached to or detached from the evaporator or dismantled for cleaning, so that it is ideal for use with milk or with food products where sanitation and easy cleaning are especially desirable.

By mounting the instrument adjacent a moving body of liquid in the evaporator, long and small diameter pipes, in which the liquid may become stagnant, causing bacteria to breed, are entirely eliminated. The turbulent liquid adjacent the instrument does not affect its precision and accuracy, however, because all movable parts, except the broad surface of one diaphragm, have no contact whatsoever with the liquid.

The switch 54 is suitably mounted upon an arm 61, which is hinged by pin 62 to the frame 33 in the space between the diaphragms 34 and 35. The pin 62 is preferably at the upper part of the frame 33 so that the arm 61 hingedly depends therefrom within the space between the diaphragms, but is free to swing in the direction of movement of the rod 49. Mounted upon the inside of the frame 33 adjacent the lower or free end of the arm 61 is a boss having parallel and spaced apart ears 63 and 64. A screw 65 extends through and is rotatably mounted in the ears 63 and 64 and is also threaded through an aperture in an ear or lug 66 provided on the lower end of the hinged arm 61. A button 67 is disposed between the arms 63 and 64 and fixed on the screw 65 to prevent endwise movement of the screw 65 while permitting free rotation thereof. Since the screw 65 is free to rotate but is held against endwise movement, it follows that when the screw is rotated by the button 67, it will thread itself through the ear 66 in one direction or the other, depending upon the direction of rotation. Thus, by turning the button 67, the arm 61 may be swung in one direction or the other so as to carry the button 55 of switch 54 toward or away from the abutment 53. A helical compression spring 68 is disposed between the ear or lug 66 on the arm 61 and one of the ears 64, so as to resist approach of the ear 66 when the screw 65 is rotated. This spring 68, by friction and pressure, prevents unintentional or accidental rotation of the screw 65, and also takes up any lost motion or slack due to play between the threads of the screw 65 and the threads of the ear 66.

By changing the positions at which the diaphragms and the rod 49 are effective to operate the switch 54, the liquid level to which the said switch will be responsive may be varied. Variations of levels up to as much as 10 feet, for example, have been easily obtained in this manner. Thus, adjustments which determine the liquid level are simply and easily made merely by a manual adjustment of the button or wheel 67, and this may be done while the evaporator is operating and while the device is mounted and in use, without emptying the reservoir or costly suspension of operations. The shell or frame 31 is provided with a hinged door 68a (Fig. 2) which provides for access to the space between the diaphragms for making adjustments of the button 67 and the pressure responsive positions of the switch.

To protect the diaphragms and switch from the injury due to excessive pressures on the diaphragms, a stop or limit bar 69 is disposed between the two diaphragms 34 and 35 and secured to the frame such as by screws 70. This bar (Fig. 4) has a notch-like indentation which loosely fits about a portion of the rod 49. The rod 49 is provided with spaced shoulders 71 and 72 which, at the desired limits of movement of the diaphragm, abut against opposite faces of the bar 69, and thereby limit movements of said connected diaphragms.

It will be evident that this pressure sensitive instrument is useful not only with evaporators, but may be also used to advantage to control the liquid level in any tank or vessel. Moreover, it may also be used to ring a bell or to operate some signal device either in combination with the control of the liquid level or quite apart therefrom.

Referring now to Fig. 6, one of the improved pressure sensitive instruments 30, instead of being secured to the cross pipe 12 as in Fig. 1, is secured to the bottom of an upright tank or well 73. At its upper end this tank or well 73 is provided with an overflow pipe 74, which fixes the upper level of the liquid in the tank. The overflow pipe discharges into any suitable reservoir (not shown). Liquid is introduced into the upright tank 73 in any suitable manner such as by an inlet pipe 75, which preferably opens into the bottom part of the tank 73 in close proximity to or just above the instrument 30, so that the liquid adjacent the instrument 30 is in motion and will not become stagnant. The pipe 75 is connected to one side of the reciprocating pump 76 which is operated by steam pump motor 77. The other side of the pump 76 is connected by pipe 78 to the source of fluid whose density is to be regulated, and this may conveniently be, for example, an evaporator of the type shown in Fig. 1. In an evaporator of that type it is desirable to concentrate the liquid, such as milk, to a desired density and to regulate this density automatically within reasonably close limits. The mechanism shown in Fig. 6 is very useful for this purpose.

Accordingly, the pipe 78 is connected to the outlet pipe 27 of Fig. 1, which is an outlet from the pipe 12 immediately below the tank or well 11. The pump 76 draws liquid from the bottom of the evaporator and circulates it upwardly through the tank 73 to the overflow pipe 74. The steam motor 77 is supplied with operating steam through a pipe 79 controlled by valve 80, and the valve element 81 of valve 80 is connected to an operating crank arm 82 which is fixed on a shaft 83 of an electric motor device 84, similar to the motor device 25. The motor 84, like motor 25, has a gear reduction giving a large ratio of gear reduction of speed, so that it slows down the valve movements and avoids frequent switch operations. Device 84 is supplied with operating current through cable 85, and the three-wire cable 86 connects the motor 84 with the instrument 30, it being understood that the motor 84 is controlled from the instrument 30 through the cable 86 in the same manner that the motor 25 is controlled from the instrument 30 by the cable 32 in Figs. 1 to 3.

The chamber at the outer face of the diaphragm 35 is connected by a flexible pipe 87 to a source of known or selected pressure which may be a tank 88, and when the tank 88 and the pipe 87 are filled with a liquid, the outer face of the diaphragm 35 will have impressed thereon a pressure force proportional to the height of the column of liquid in the pipe 87 and the tank 88, which is above the level of the diaphragm 35, and since this liquid in pipe 87 and tank 88 is static, the selected hydrostatic pressure on the outer face of the diaphragm 35 will remain substantially constant, and may be used as a reference pressure for determining the desired density of the liquid in the tank 73. Since one may desire to vary this static pressure on the diaphragm 35 and thereby vary the density of the liquid in the tank 73, any suitable means may be provided for varying the column of liquid in pipe 87 and tank 88. While this may be done by adding to or removing liquid from the tank 88, a very simple and effective way is to make the pipe 87 a flexible pipe, and elevate or lower the tank 88 to selected extents. Such elevation and lowering of tank 88 will vary the hydrostatic pressure of the liquid on the diaphragm 35. The tank 88 may have a hook 89 which is engaged over any of a plurality of pegs 90 arranged at different levels, so that by engaging the hook 89 selectively over any of the pegs 90 one may vary the hydrostatic pressure on the outer face of the diaphragm 35 and thus vary the density of the liquid in the tank 73.

The operation of the mechanism shown in Fig. 6 will now be described. Let it be assumed that the pipe 78 is connected to an evaporator of the type shown in Fig. 1, and that it is desired to control the density of the milk being concentrated in the vaporator. One first elevates the tank 88 to a position representing the particular density desired in the milk being concentrated in the evaporator of Figs. 1 to 3. This places a definite hydrostatic pressure on the outer face of the diaphragm 35 and since the diaphragms 34 and 35 are connected by a rod 49 disposed to operate the micro switch which controls the motor 84, it follows that the connected diaphragms 34 and 35 will be directly responsive to the differences in pressures, namely the hydrostatic pressure caused by the column of liquid in pipe 87 and tank 88 on one side and the pressure at the bottom of the column of liquid, such as concentrated milk in the tank 73 on the other side. Because of the overflow 74, the column of liquid in the tank or well 73 will always be of the same height, but the pressure exerted by the column of liquid of that height on the diaphragm 34 will be directly proportional to the density of the liquid in the tank or well 73. Therefore, as the density of the processed milk in the tank or well 73 varies, the resultant pressure forces on the diaphragms 34 and 35 will vary.

As the density of the milk in the tank or well 73 decreases to a point less than that of the pressure created by the column of liquid in the pipe 87 and tank 88, the diaphragms 34 and 35 will move upwardly, and the micro switch in the instrument 30 will cause an operation of the motor device 84 in one direction to shut off the valve 80 and thus slow down the speed of the pump 76 and thereby cut down the rate at which the condensed milk is withdrawn from the evaporator and passed through the tank or well 73. Since the heating and evaporation processes continue at the same rate, a decrease in the rate of removal of the condensed liquid will result in an increased concentration of the milk in the evaporator, that is, an increase in its density. As the density increases, the colmn of liquid in tank 73 will exert an increasing force on the diaphragm 34 at the bottom of the tank or well 73, since the liquid is continuously moving through this tank or well 73. When the density is built up in this manner, the connected diaphragms 34 and 35 will move downwardly to operate the micro switch in the instrument 30, and thus cause an operation of the motor device 84 in a direction to open the valve 80 and admit more operating steam to the steam motor 77, to increase the rate of operation of the pump 76. When the speed of the pump 76 increases, it draws out the condensed milk more rapidly, and since the evaporator continues to operate at a standard rate it follows that an increased rate of removal of the liquid will cause a decrease in the density of the liquid, because liquid removed is replaced by less concentrated material. Since the liquid passes continuously through the tank or well 73, it follows that when the density again falls, the instrument 30 at the bottom of that tank or well will again operate to reverse the motor device 84 and cause a decrease in the rate of operation of the pump. Thus, the density of the liquid in the evaporator is continuously and automatically regulated by the mechanism shown in Fig. 6, and in normal operation the valve 80 will not be entirely shut off or fully opened, but will be moved between its open and closed position by amounts which will produce a very uniform density of the milk product delivered through the overflow pipe 74 to the storage reservoir.

The diaphragms 34 and 35 may be made of an elastic material of any type such as rubber or metal, or they may be of the bellows type if desired. I prefer to use with a milk evaporator, however, a flat, stainless steel diaphragm which is easily cleaned, and will therefore be preferred by boards of health or other inspecting agencies.

It is noteworthy that with the direct action of the connected diaphragms on the highly sensitive switch, there is no time lag due to frictional sticking of floats, valves, shafts passing through packing boxes and the like, which were common in prior devices. The snap action of the switch, which is itself highly sensitive and has very little frictional resistance, assures immediate actuation of the valve controlling motor, and when fairly thin, responsive diaphragms are used, an extremely sensitive and accurate control is obtained. This improved device also gives a wide range of adjustments for liquid levels.

The easy adjustability and sensitivity and accuracy of the instrument make its use with an evaporator particularly advantageous. In a multiple effect evaporator, for example, the liquid levels and the pressures or vacuum in various effects must often be quite different from each other for efficient operation. Liquid levels in the various effects may differ by two or three feet and in some cases much more. The best operating level for any particular substance to be treated usually is discovered by trial and error, and heretofore the evaporator manufacturer frequently had to send an expert to the customer's plant to make necessary adjustments. The construction of my improved instrument, however, enables a relatively unskilled workman to make any required liquid level or density adjustments accurately and quickly, and the efficiency of evaporator operation is thereby greatly increased.

It will be obvious that various other changes and modifications of the details of the invention here shown and described in order to explain the nature of the invention may be made by those skilled in the art within the principles and scope of the invention as set forth in the appended claims.

I claim as my invention:

1. An improved, continuous flow type, liquid condensing apparatus comprising an evaporating chamber having spaced inlet and outlet connections in the lower part thereof, means for heating liquid in said chamber, means connected to the upper part of said chamber for creating a continuing partial vacuum therein and withdrawing vapors therefrom, means responsive to the pressure differential in said chamber between zones of said chamber above and below the expected operating range of liquid levels in said chamber, a valve controlling the flow of liquid through said inlet connection into said chamber, motor operated means for slowly operating said valve in each direction selectively and requiring a plurality of minutes to move said valve in each direction between fully open and fully closed positions, and means controlled by said pressure responsive means and in turn controlling said motor operated means and operable to cause said motor operated means to move said valve slowly in a closing direction when the liquid level in said chamber is above a selected level, and in an opening direction when the liquid level in said chamber is below said selected level, whereby the flow of liquid through said chamber may be substantially continuous and abrupt changes in the rate of liquid flow through said chamber may be avoided.

2. An improved, continuous flow type, liquid condensing apparatus, comprising an evaporating chamber having spaced inlet and outlet connections in the lower part thereof, means for heating liquid in said chamber, means connected to the upper part of said chamber for creating a continuing partial vacuum therein and withdrawing vapors therefrom, means responsive to the pressure differential in said chamber between zones of said chamber above and below the expected operating range of liquid levels in said chamber, a valve controlling the flow of liquid through said inlet connection into said chamber, a reversible electric motor, a speed reduction device driven by said motor and in turn operating said valve slowly in each direction, selectively, depending upon the direction of rotation of said motor, and requiring more than a minute to move said valve in each direction between fully open and fully closed positions, means including electric circuits connected to and operating said motor for determining the direction of operation of said motor, and a switch operated by said pressure operated means and included in said electric circuits to control the direction of operation of said motor, and operable to cause said motor to move said valve in a closing direction when the liquid level in said chamber is above a selected level, and in an opening direction when the liquid level in said chamber is below said selected level, whereby the flow of liquid through said chamber may be substantially continuous and abrupt changes in the rate of liquid flow through said chamber may be avoided.

3. An improved, continuous flow type, liquid condensing apparatus, comprising two wells for the liquid to be evaporated, disposed side by side, and connected adjacent their tops and bottoms to form a chamber, means for heating the liquid in one of said wells, means for applying a partial vacuum to the upper portion of the other of said wells, an inlet conduit opening into the bottom of said one well for supplying said liquid thereto and having a controlling valve, an outlet pipe connected to said chamber adjacent the bottom of said other well, a motor, speed reducing mechanism connecting said motor to said valve for slowly operating said valve in opposite directions, means connected to said chamber above and below the expected variations in liquid level therein and responsive only to the pressure of the liquid head therein, and means controlled by said responsive means and in turn controlling said motor to cause a reversal in the direction of operation of said motor as the liquid level in said chamber rises and falls from a selected level whereby the flow of liquid through said chamber will be substantially continuous and abrupt changes in the flow of liquid through said chamber may be avoided.

4. An improved, continuous flow type, liquid condensing apparatus, comprising two wells for the liquid to be evaporated, disposed side by side, and connected adjacent their tops and bottoms to form a chamber, means for heating the liquid in one of said walls, means for applying a partial vacuum to the upper portion of the other of said wells, an inlet conduit opening into the bottom of said one well for supplying said liquid thereto and having a controlling valve, an outlet pipe connected to said chamber adjacent the bottom of said other well, motor operated means connected to and operating said valve slowly in each direction selectively at a rate requiring in excess of a minute, to fully open or close the valve, means connected to said chamber above and below the expected variations in liquid level therein and responsive only to the pressure of the liquid head therein, and means controlled by said pressure responsive means and in turn controlling said motor operated means and causing said valve to be operated by said motor operated means in a closing direction when the liquid level in said chamber is above a selected level, and in an opening direction when the liquid level in said chamber is below said selected level, whereby the flow of liquid through said chamber may be substantially continuous and abrupt changes in the rate of liquid flow through said chamber may be avoided.

FRED F. HOUSE.